(12) United States Patent
Allgeier et al.

(10) Patent No.: US 11,825,786 B2
(45) Date of Patent: Nov. 28, 2023

(54) INDOOR GARDEN CENTER WITH A DRIVE ASSEMBLY UTILIZING POSITIONAL FEEDBACK

(71) Applicant: Haier US Appliance Solutions, Inc., Wilmington, DE (US)

(72) Inventors: Brian Allgeier, Louisville, KY (US); Jordan Andrew Waymeyer, Louisville, KY (US); Erik Stennis, Louisville, KY (US); Kira Hartlage, Louisville, KY (US); Collin Dietz, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 228 days.

(21) Appl. No.: 17/110,648

(22) Filed: Dec. 3, 2020

(65) Prior Publication Data
US 2022/0174898 A1 Jun. 9, 2022

(51) Int. Cl.
*A01G 31/06* (2006.01)
*A01G 9/02* (2018.01)

(52) U.S. Cl.
CPC .............. *A01G 31/06* (2013.01); *A01G 9/023* (2013.01)

(58) Field of Classification Search
CPC ................................. A01G 31/06; A01G 9/023
See application file for complete search history.

(56) References Cited

U.S. PATENT DOCUMENTS

| | | | |
|---|---|---|---|
| 10,136,594 B2 | 11/2018 | Blank | |
| 11,310,976 B1* | 4/2022 | Cross | A01G 7/045 |
| 2012/0249310 A1* | 10/2012 | Hotaling | G01S 5/08 340/13.24 |
| 2015/0000190 A1 | 1/2015 | Gibbons | |
| 2018/0042186 A1 | 2/2018 | Kop | |
| 2019/0159415 A1 | 5/2019 | Bellay | |
| 2020/0037514 A1 | 2/2020 | Massey | |
| 2020/0068821 A1 | 3/2020 | Tryon et al. | |
| 2020/0093080 A1* | 3/2020 | Grifa | A01G 7/045 |
| 2021/0176935 A1* | 6/2021 | Massey | A01G 9/249 |

FOREIGN PATENT DOCUMENTS

| | | | | |
|---|---|---|---|---|
| CN | 103081744 B | 4/2015 | | |
| EP | 1445494 B1 | 6/2006 | | |
| JP | 2007/093532 A | 4/2007 | | |
| JP | 2015/004630 A | 1/2015 | | |
| WO | WO-2016164652 A1 * | 10/2016 | ............. | A01G 31/00 |
| WO | WO-2018068042 A1 * | 4/2018 | ............. | A01G 31/02 |

* cited by examiner

*Primary Examiner* — Monica L Perry
*Assistant Examiner* — Brittany A Lowery
(74) *Attorney, Agent, or Firm* — Dority & Manning, P.A.

(57) ABSTRACT

An indoor gardening appliance includes a grow module that is seated on a turntable that is rotatably mounted within a grow chamber and is rotated by a drive assembly. A position sensing assembly monitors an angular position using two proximity sensors, such as Hall-effect sensors, mounted below the sump at the same circumferential position but at different radial positions. The turntable includes a plurality of proximity indicators, such as magnets, positioned at each of three circumferential positions on the turntable and at different radiuses to define a two-digit binary code corresponding to each of the three circumferential positions that is detectable by the proximity sensors.

19 Claims, 15 Drawing Sheets

INDOOR GARDEN CENTER WITH A DRIVE ASSEMBLY UTILIZING POSITIONAL FEEDBACK

FIELD OF THE INVENTION

The present subject matter relates generally to systems for gardening plants indoors, and more particularly, to a system and method for using positional feedback to improve the rotation of a grow module in an indoor garden center.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Certain indoor garden centers include a rotating plant support rack that divides the grow chamber into a plurality of sub-compartments. The environment in each of these sub-compartments may be maintained independently as needed depending on the plants stored in that sub-compartment. For example, the temperature, humidity, hydration cycles, and lighting profiles may vary depending on the particular plants present within a particular sub-compartment. However, drive motors that rotate these conventional support racks often lack positional precision and may presume a position of the grow module based on motor drive time or other factors. However, this may frequently result in the plant support rack not being positioned properly within a desired zone, e.g., such that the plant support rack is positioned between zones where a seal between adjacent sub-compartments may be ineffective. As a result, independent environmental control may be difficult, light may bleed between sub-compartments may occur, and overall perceived appliance quality may be degraded.

Accordingly, an improved indoor garden center would be useful. More particularly, an indoor garden center with a drive system that more accurately positions a grow module within a grow chamber would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction is provided. The gardening appliance includes a liner positioned within a cabinet and defining a grow chamber, a grow module mounted within the liner and defining a plurality of apertures for receiving one or more plant pods, a sump positioned proximate a bottom of the cabinet and defining a collection reservoir, a turntable rotatably mounted to the sump and being configured for supporting the grow module, a position sensing assembly operably coupled to the sump and the turntable for monitoring an angular position of the turntable relative to the sump, and a drive assembly for selectively rotating the turntable within the grow chamber based at least in part on the angular position of the turntable.

In another exemplary embodiment, a position sensing assembly for monitoring an angular position of a turntable within a sump of an indoor gardening appliance to provide feedback to a drive assembly for selectively rotating the turntable. The position sensing assembly includes a first proximity sensor and a second proximity sensor mounted to the sump at hub alignment position along a circumferential direction, the first proximity sensor being positioned at a first radial position and the second proximity sensor being positioned at a second radial position, and a plurality of proximity indicators positioned at three circumferential positions on the turntable, the plurality of proximity indicators being positioned at different radiuses at each of the three circumferential positions to define a two-digit binary code corresponding to each of the three circumferential positions that is detectable by the first proximity sensor and the second proximity sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
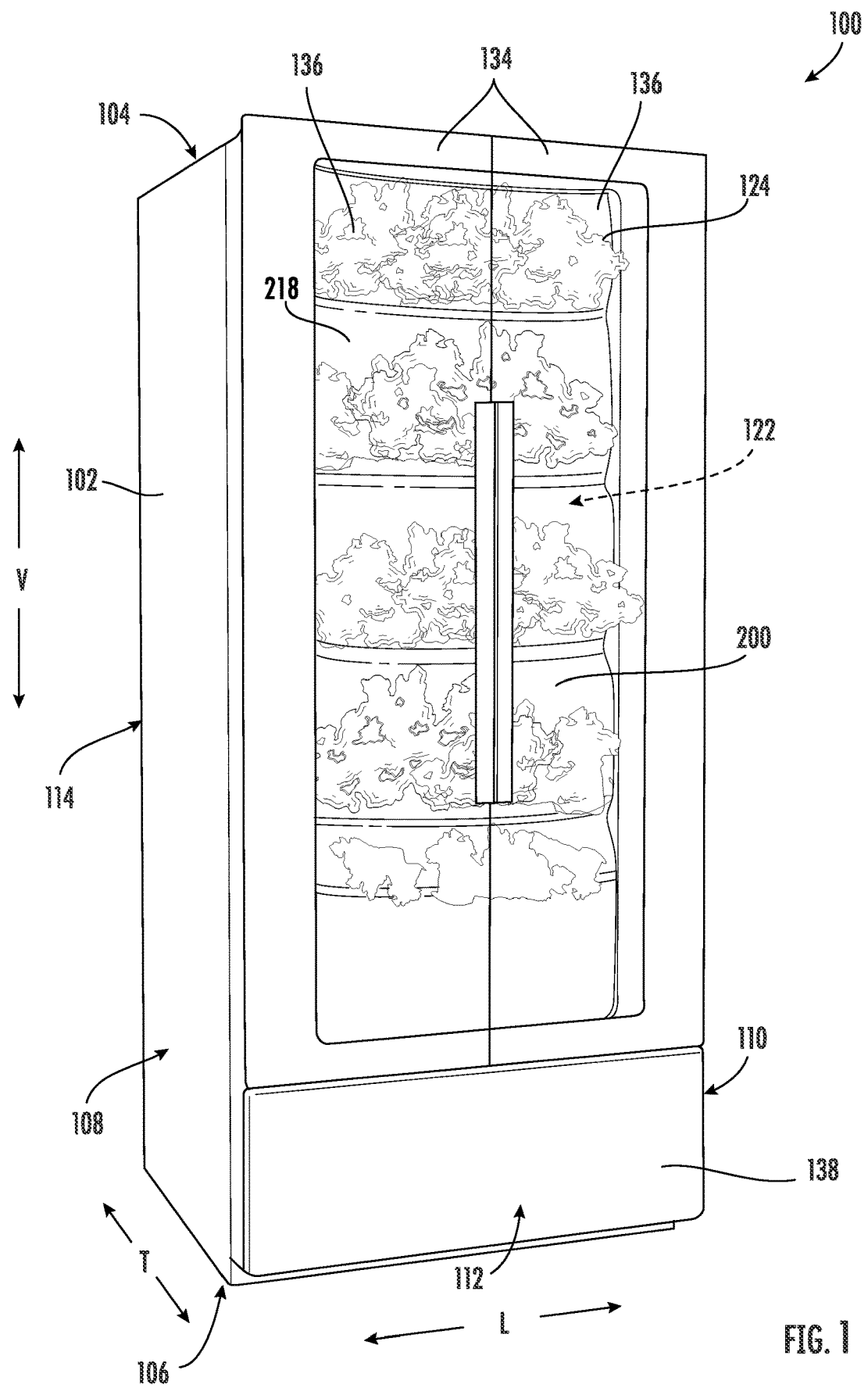
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
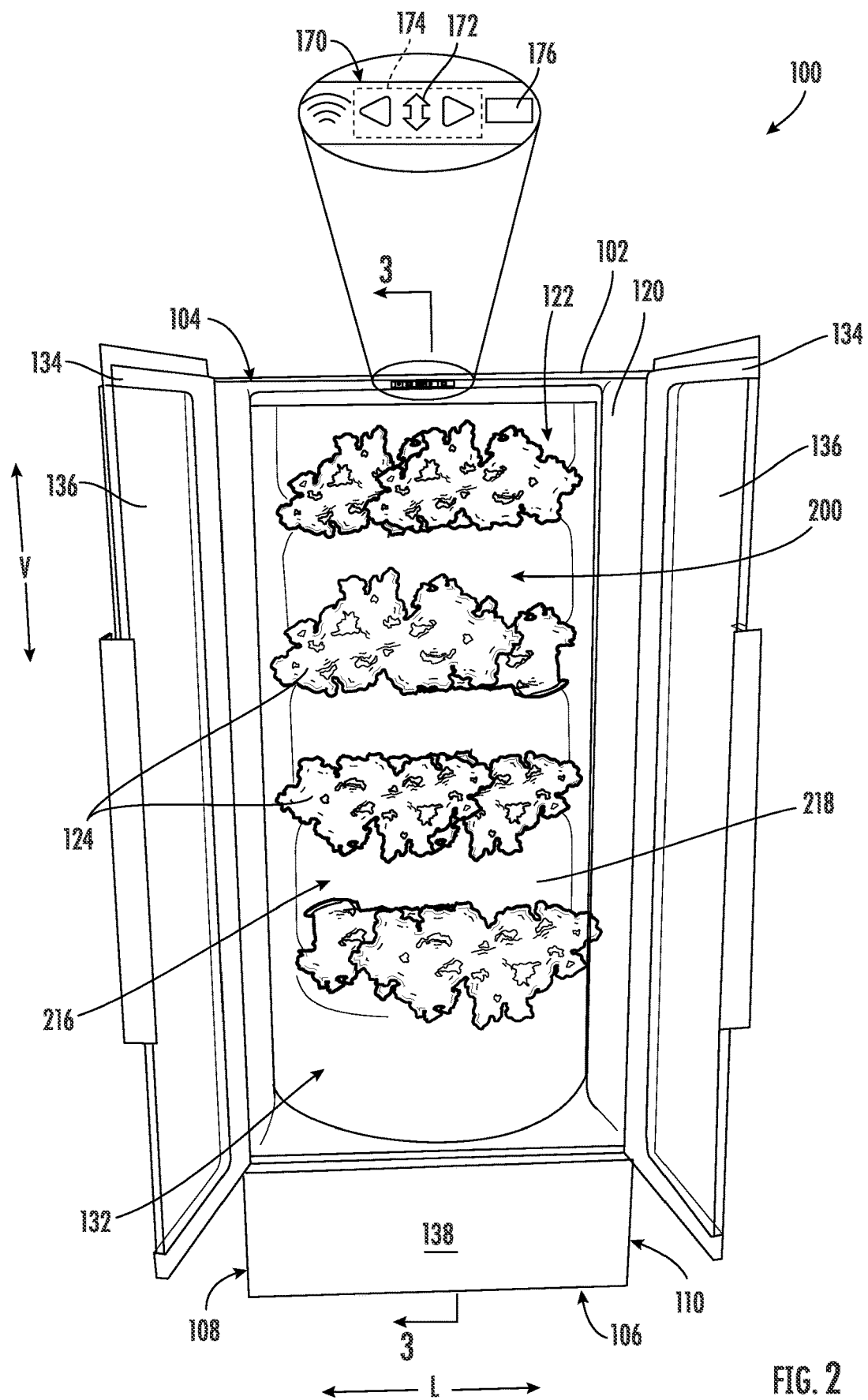
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
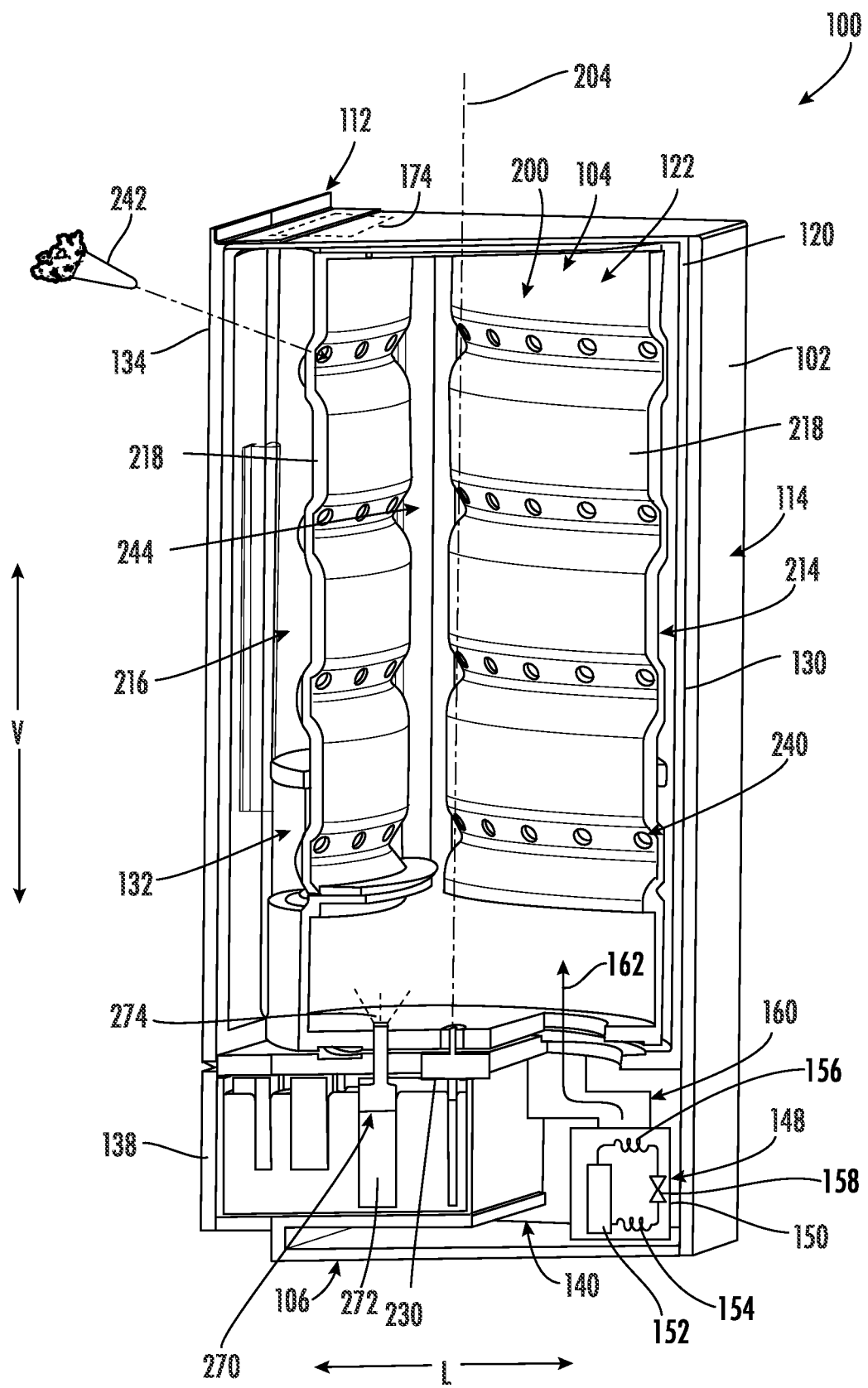
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
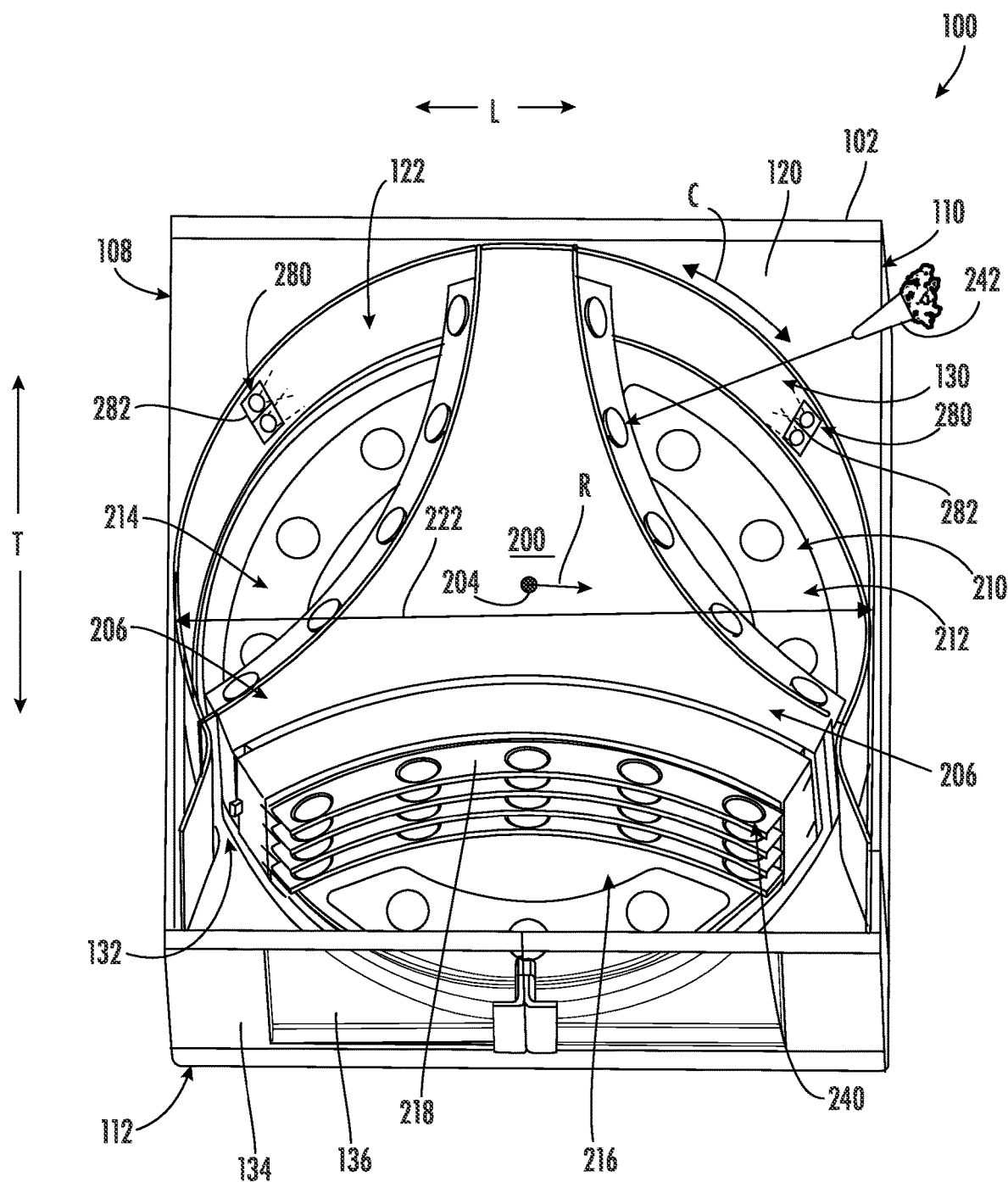
FIG. 4 is a top perspective view of the exemplary gardening appliance of FIG. 1, with the top panel of the cabinet removed to reveal a rotatable grow module according to an exemplary embodiment of the present subject matter.
Figure 5:
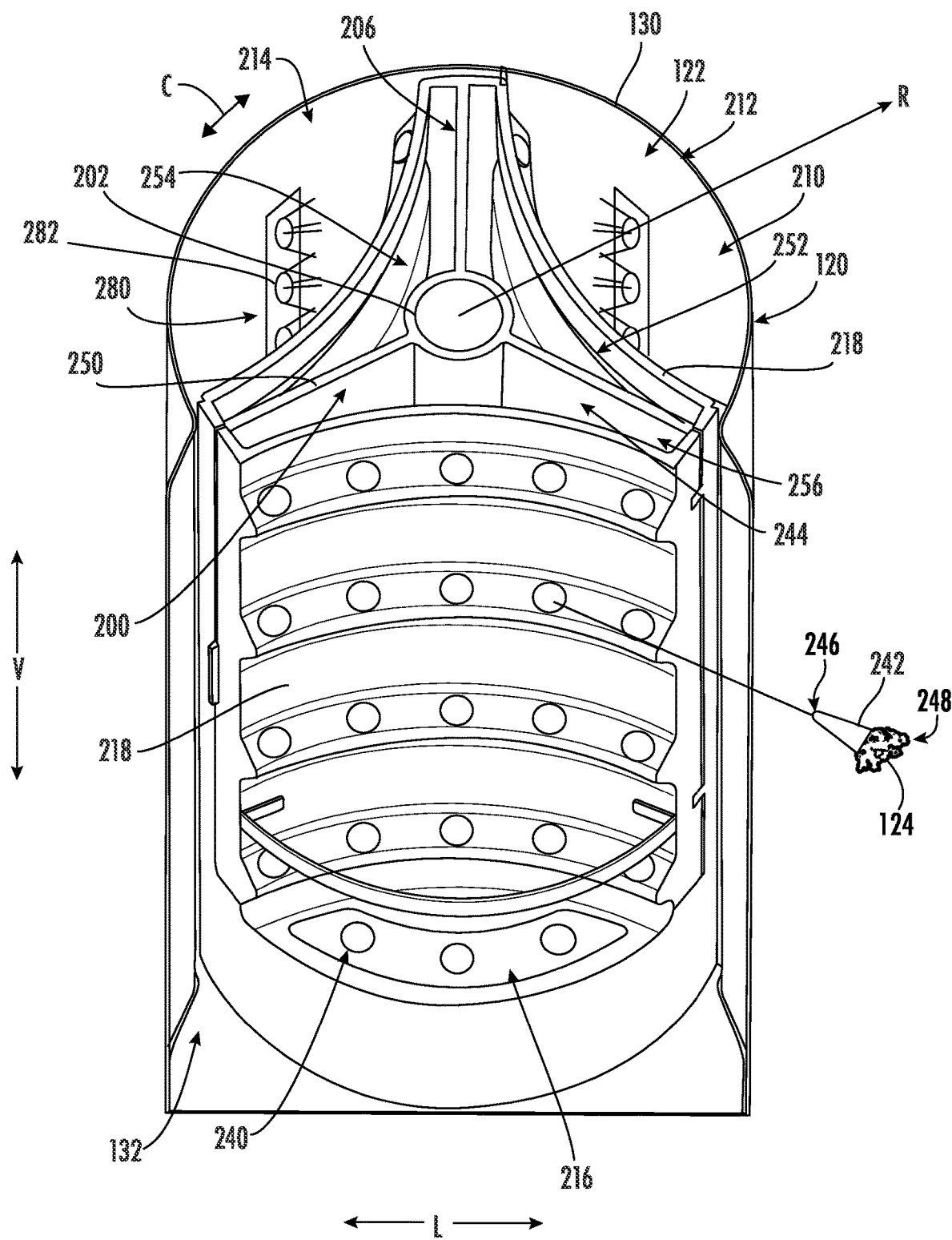
FIG. 5 provides a perspective cross sectional view of the exemplary gardening appliance of FIG. 1 according to another exemplary embodiment of the present subject matter.
Figure 6:
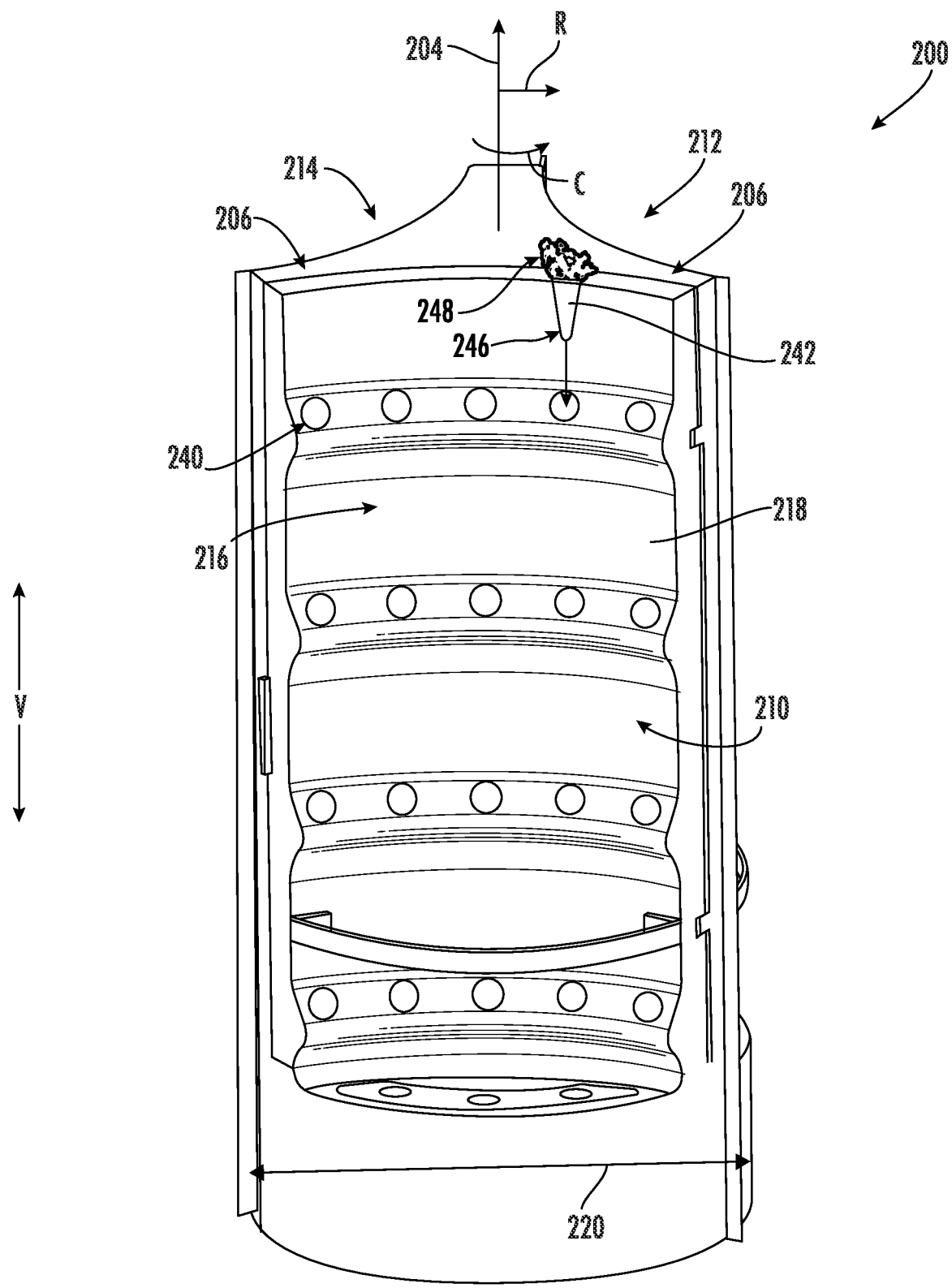
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
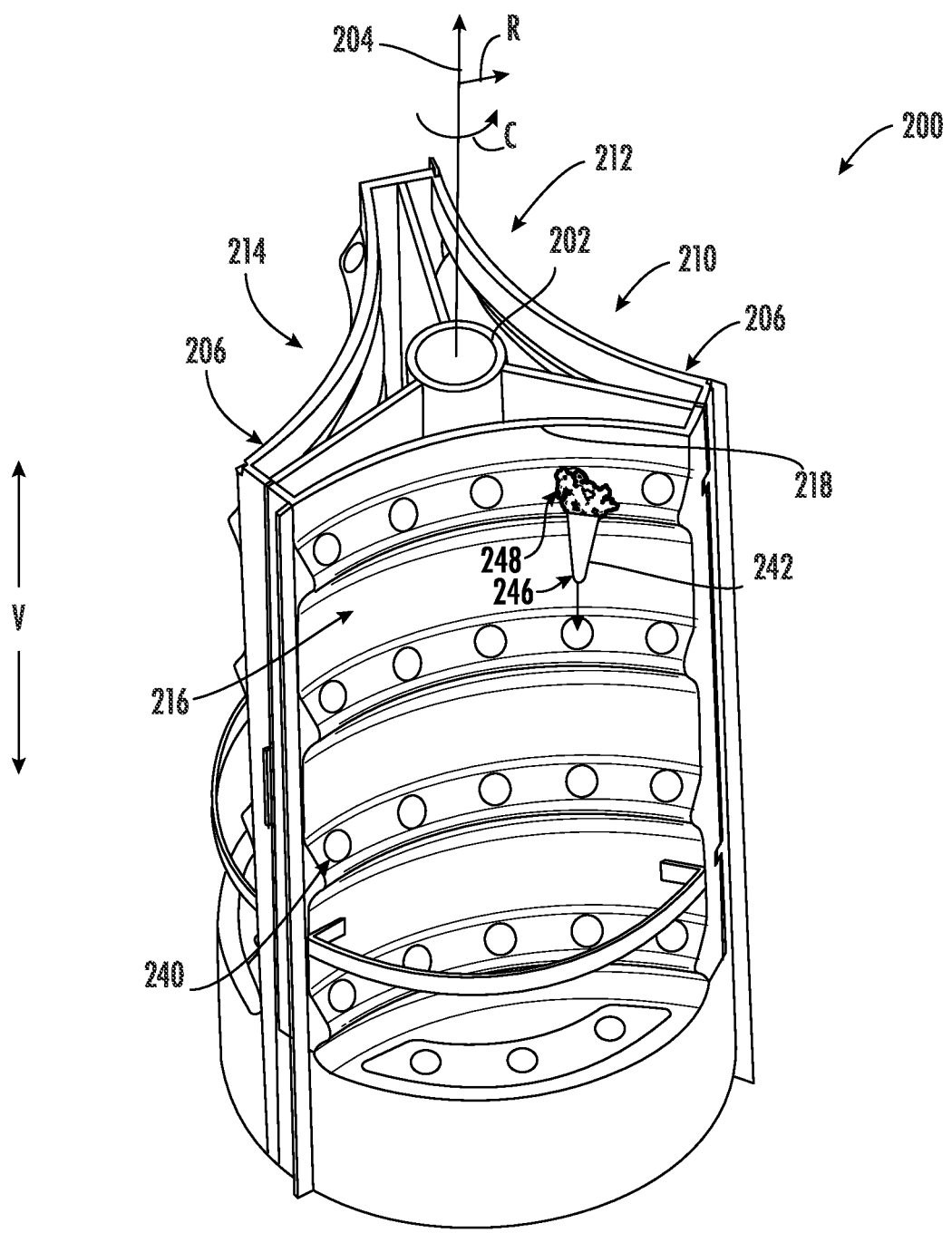
FIG. 7 provides a perspective cross sectional view of the exemplary grow module of FIG. 6 according to another exemplary embodiment of the present subject matter.
Figure 8:
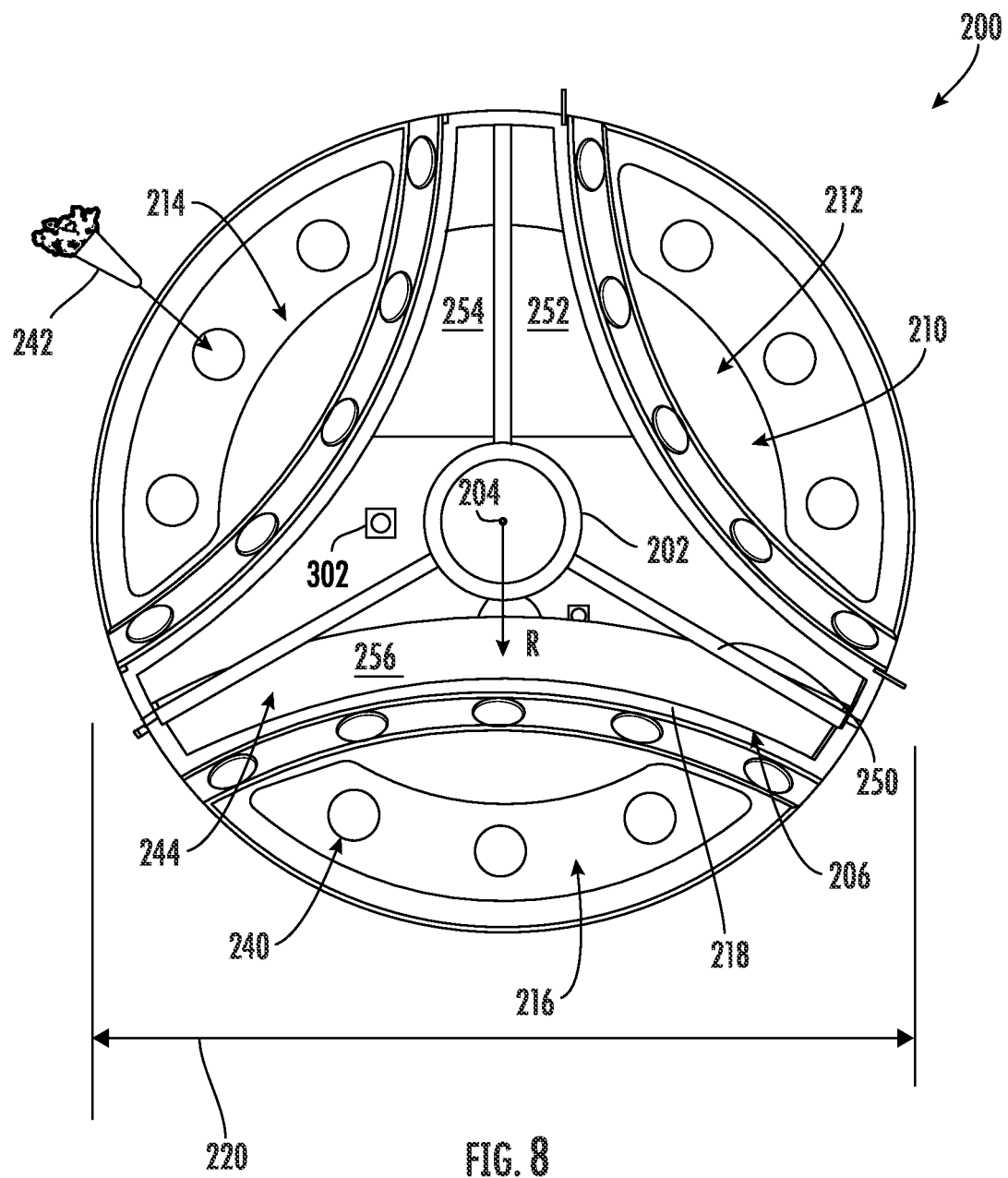
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

As best shown in FIG. 3, environmental control system 148 may further include a hydration system 270 which is generally configured for providing water and/or nutrients to plants 124 to support their growth. Specifically, according to the illustrated embodiment, hydration system 270 may be fluidly coupled to a water supply and or nutrient distribution assembly to selectively provide desirable quantities and concentrations of hydration, nutrients, and/or other fluids onto plants to facilitate improved plant growth. For example, hydration system 270 includes a water supply 272 and misting device 274 (e.g., such as a fine mist spray nozzle or nozzles). For example, water supply 272 may be a reservoir containing water (e.g., distilled water) or may be a direct connection municipal water supply. According to exemplary embodiments, hydration system 270 may include one or more pumps (not shown) for providing a flow of liquid nutrients to misting device 274. In this regard, for example, water or nutrients that are not absorbed by roots of plants 124 may fall under the force of gravity into a sump and these pumps may be fluidly coupled to the sump to recirculate the water through misting device 274.

Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out through front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now to FIGS. 9 through 12, a drive assembly 300 will be described according to an exemplary embodiment of the present subject matter. Specifically, drive assembly 300 is generally positioned within gardening appliance 100 and is operably coupled to grow module 200 for selectively rotating grow module within grow chamber 122. Although an exemplary embodiment of drive assembly 300 is described below as being used rotate grow module 200 within gardening appliance 100, it should be appreciated that variations and modifications may be made to drive assembly 300 while remaining within the scope of the present subject matter. In addition, it should be appreciated that drive assembly 300 is not limited to the exemplary application described herein. Indeed, drive assembly 300 may be used rotate any grow module within any gardening appliance.

Figure 9:
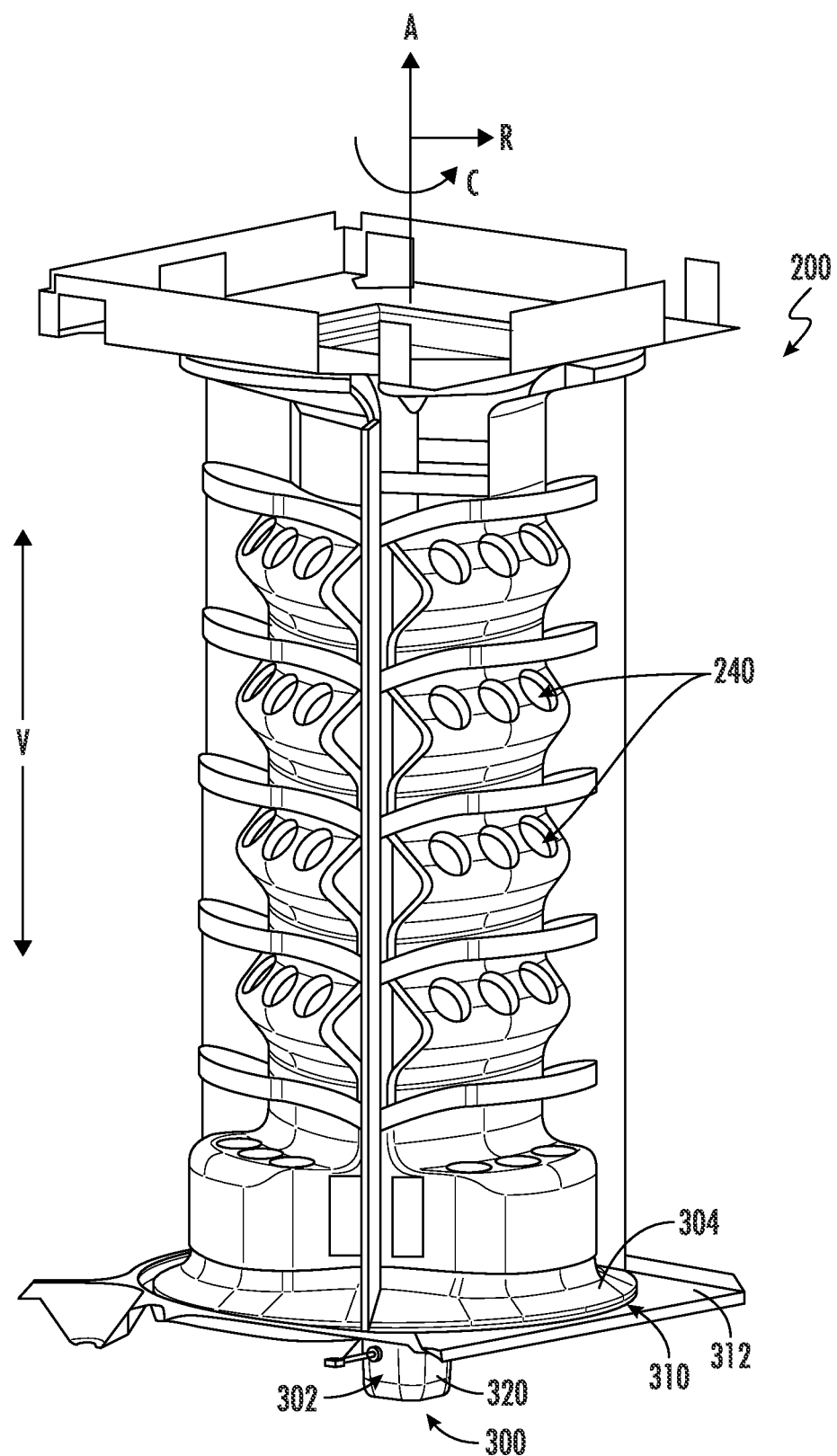
FIG. 9 provides a perspective view of a grow module and a drive assembly that may be used with the exemplary gardening appliance of FIG. 1 according to an exemplary embodiment of the present subject matter.
Figure 10:
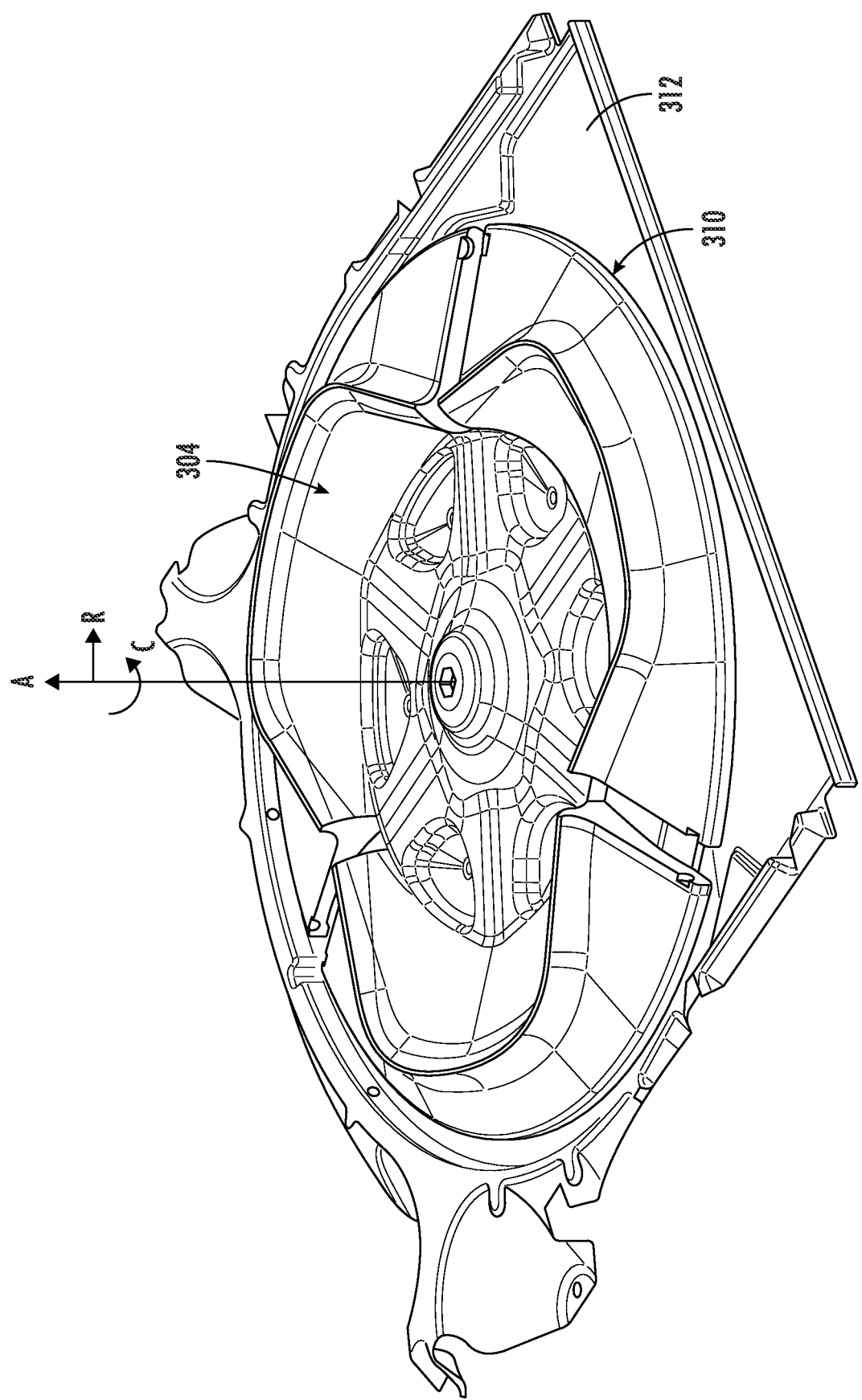
FIG. 10 provides a perspective view of a sump and a turntable for supporting the exemplary grow module of FIG. 9 according to an exemplary embodiment of the present subject matter.
Figure 11:
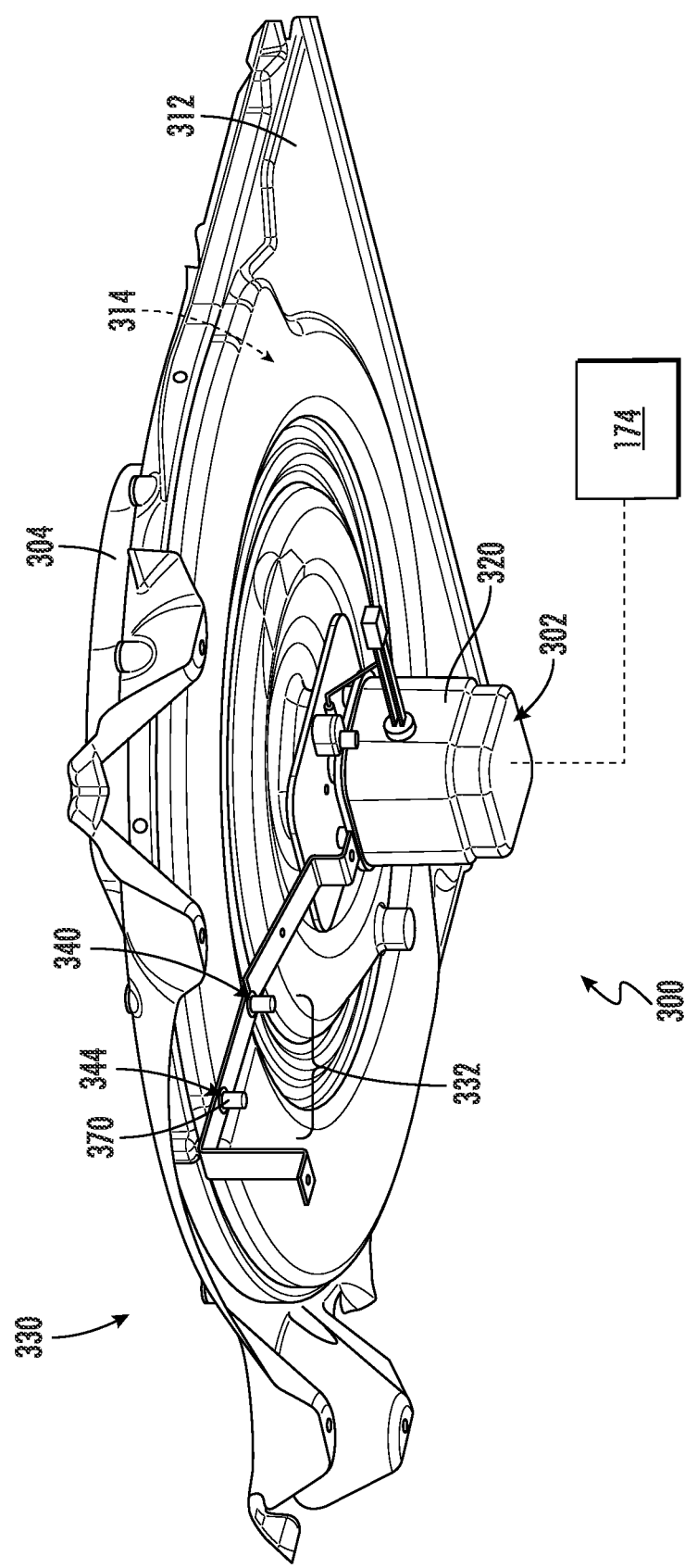
FIG. 11 provides a bottom, perspective view of the exemplary sump and turntable of FIG. 10 according to an exemplary embodiment of the present subject matter.
Figure 12:
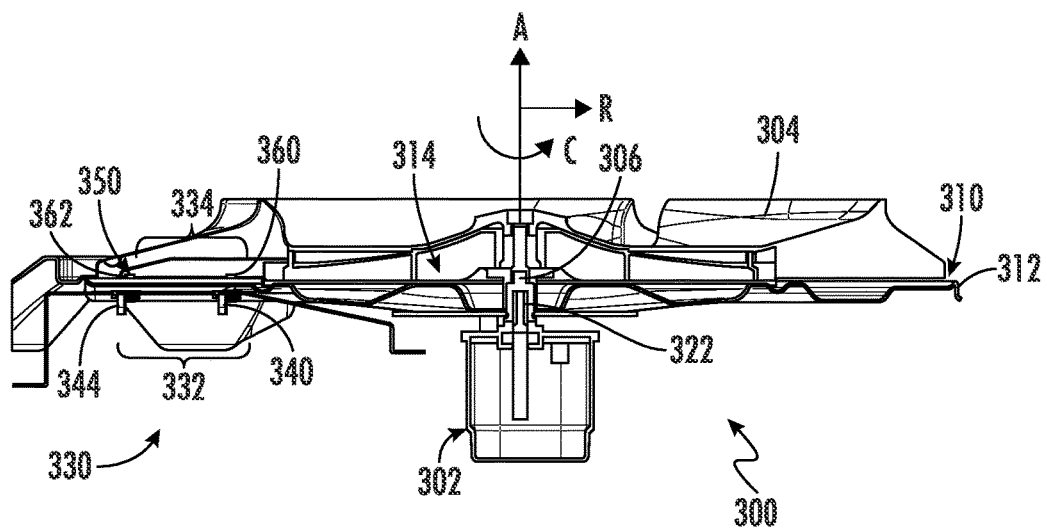
FIG. 12 provides a cross sectional view of the exemplary sump and turntable of FIG. 10 according to an exemplary embodiment of the present subject matter.
Figure 13:
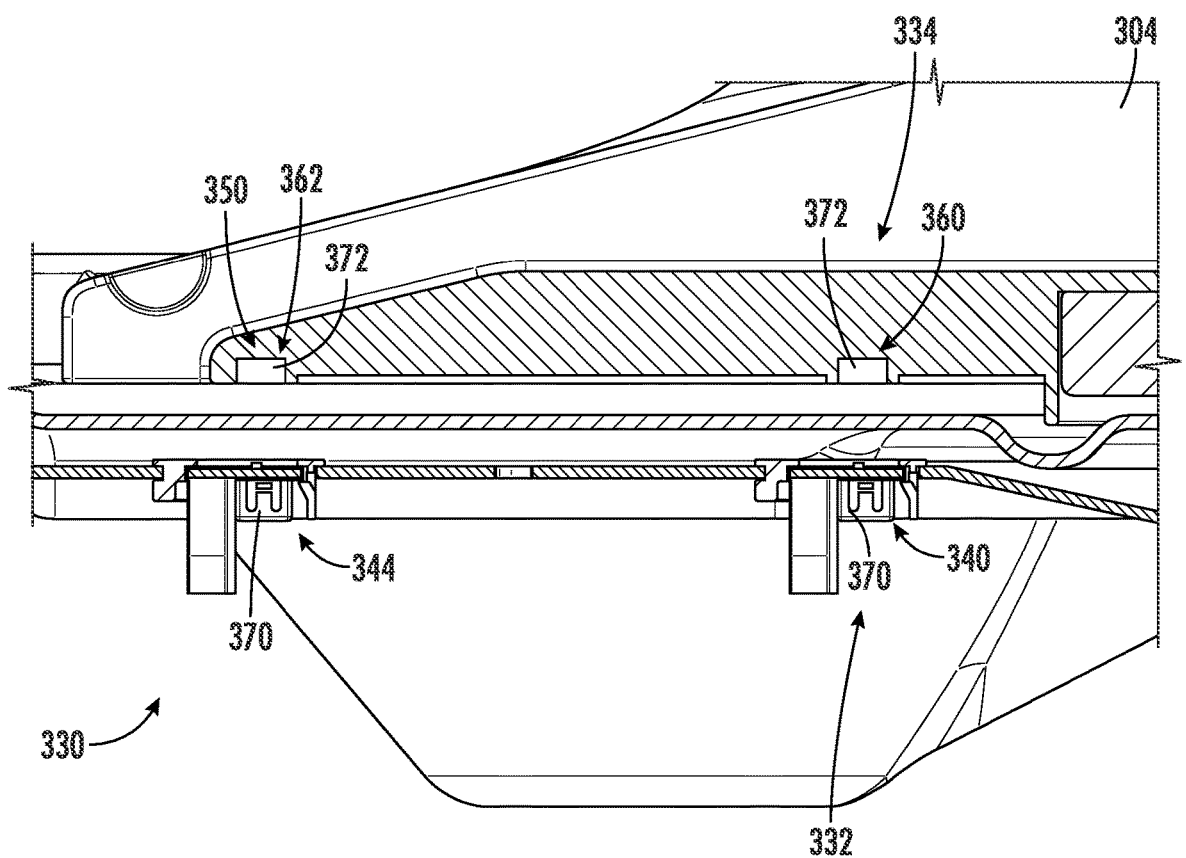
FIG. 13 provides a close-up, cross sectional view of the exemplary sump and turntable of FIG. 10 according to an exemplary embodiment of the present subject matter.
Figure 14:
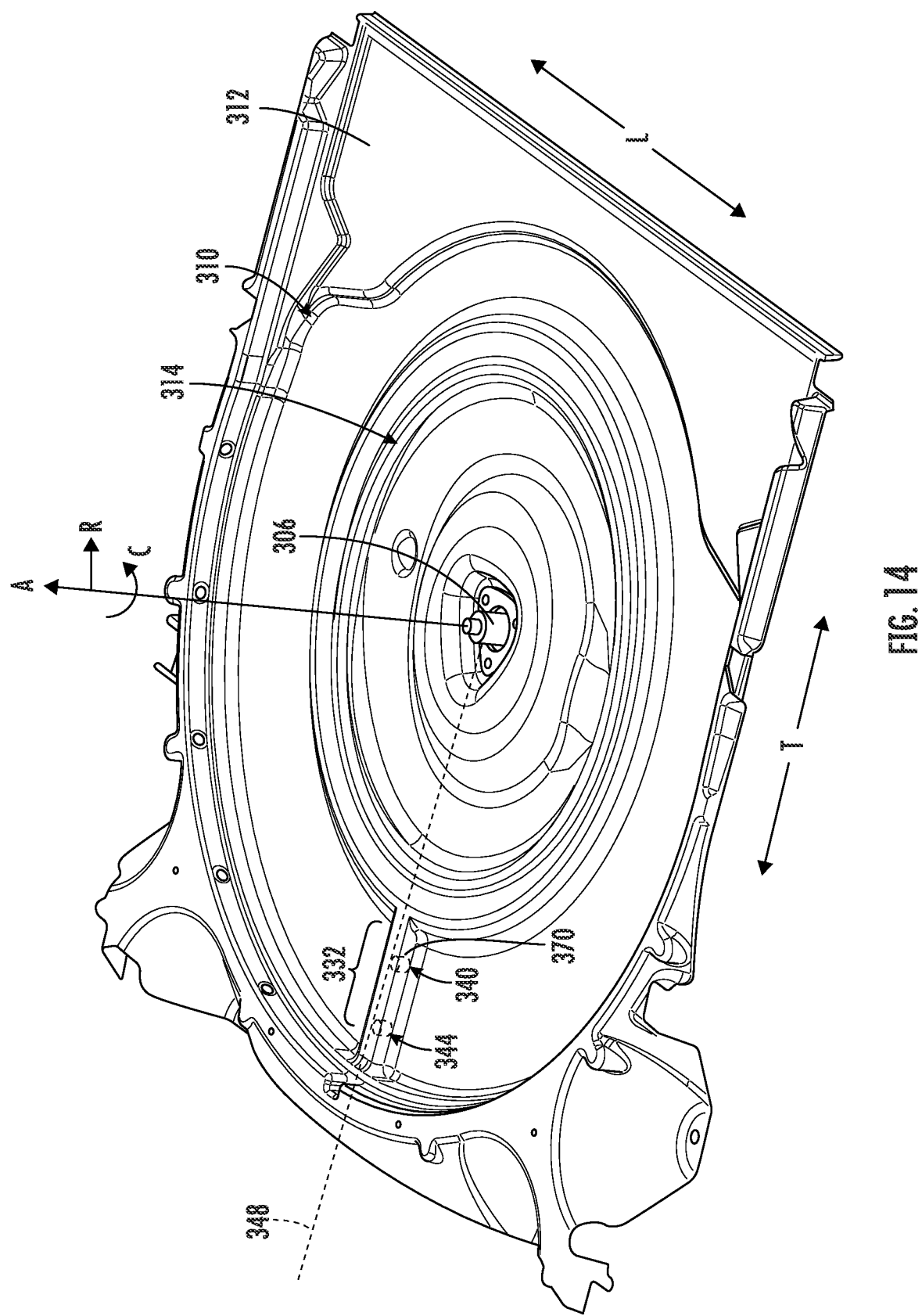
FIG. 14 provides a perspective view of the exemplary sump of FIG. 10 according to an exemplary embodiment of the present subject matter.

As illustrated, drive assembly 300 may generally include a motor assembly 302, a turntable 304, and a clutch assembly 306. Each of these components and assemblies will be described in more detail below according to exemplary embodiments of the present subject matter. As best shown in FIG. 9, turntable 304 is rotatably mounted within an aperture 310 that is defined in a sump 312 that partially defines grow chamber 122. As illustrated, sump 312 defines a collection reservoir 314 (see, e.g., FIG. 14) within which water runoff, excess nutrients, and other byproducts of the growing process may be collected under the force of gravity. In this regard, for example, turntable 304 may include one or more apertures or channels through which liquids and other debris may flow into collection reservoir 314 (e.g., for recirculation or disposal). As best shown in FIG. 11, motor assembly 302 may be positioned at least partially below sump 312 and may be protected from liquids in collection reservoir 314. It should be appreciated the gardening appliance 100 may include additional features for isolating or sealing motor assembly 302 to protect it from liquid collected within collection reservoir 314.

Notably, motor assembly 302 may be the same or similar to motor 230 described above. In this regard, motor assembly 302 may include any suitable drive motor and/or transmission assembly for rotating grow module 200. For example, motor assembly 302 may include a brushless DC electric motor, a stepper motor, or any other suitable type or configuration of motor. For example, motor assembly 302 may include an AC motor, an induction motor, a permanent magnet synchronous motor, or any other suitable type of AC motor. In addition, motor assembly 302 may include any suitable transmission assemblies, clutch mechanisms, or other components. According to exemplary embodiments, motor assembly 302 is capable of bi-directional rotation, e.g., such that it may rotate grow module 200 in the clockwise and counterclockwise directions.

Specifically, as illustrated, motor assembly 302 includes a drive motor 320 that selectively rotates a motor shaft 322. In this regard, motor shaft 322 may define an axial direction A corresponding to the axis of rotation of drive motor 320, a radial direction R that extends perpendicular to the axial direction A, and a circumferential direction C that corresponds with the direction of rotation of motor shaft 322 (e.g., clockwise or counterclockwise). References to the axial direction A, the radial direction R, and the circumferential direction C may be used herein to refer to the position of turntable 304 relative to sump 312 or cabinet 102. It should be appreciated that these directional orientations may refer to the same or similar orientations as described above for grow module 200.

Clutch assembly 306 may rotatably couple motor shaft 322 to turntable 304. Specifically, motor shaft 322 may be mechanically coupled to turntable 304 through clutch assembly 306 for providing drive torque to facilitate rotational motion of grow module 200 and vertical support for supporting the weight of grow module 200, plants 124, etc. Notably, clutch assembly 306 may include an internal clutch mechanism that is generally configured for limiting the torque from drive motor 320 to turntable 304. In this regard, clutch assembly 306 may have a torque slip threshold beyond which clutch assembly 306 disengages drive motor 320 from turntable 304. This torque slip threshold may be any suitable torque selected for any suitable purpose, e.g., as a safety measure or to protect plants 124. For example, the torque slip threshold may be selected to ensure safe operation and rotation of grow module 200. In this regard, the torque slip threshold may be selected to prevent harm to a user and prevent pinch points, e.g., between grow module 200 and liner 120.

Notably, the drive assembly 300 described above provides an improved drive mechanism for rotating a grow module of a gardening appliance. In this regard, drive assembly 300 provides for efficient transmission of torque to facilitate bi-directional rotation of grow module 200 while providing a safety threshold to avoid dangerous conditions related to pinch points, e.g., using clutch assembly 306. In addition, the engagement between motor assembly 302, clutch assembly 306, and turntable 306 provides solid support structures for vertical loading and moment loading, e.g., tilting of grow module 200 that may occur when plants 124 are not equally balanced around the axial direction A. Moreover, it should be appreciated that drive assembly 300 may be fully disassembled, e.g., by removing motor assembly 302, turntable 304, and/or clutch assembly 306 for cleaning and/or maintenance. Other advantages to such a system will be evident one having ordinary skill in the art.

Referring now generally to FIGS. 9 through 16, a position sensing assembly 330 that may be used to provide closed-loop feedback to drive assembly 300 regarding the angular position of turntable 304 relative to sump 312 or cabinet 102 will be described according to exemplary embodiments of the present subject matter. In general, position sensing assembly 330 may be any suitable combination of sensors, actuators, indicators, switches, or other triggers that may be used to identify the angular orientation of turntable 304 and grow module 200 within gardening appliance 100. Notably, as described above, accurate positioning of grow module 200 within liner 120 may be desirable to improve isolation of grow chambers 212-216, to prevent light bleed from light assembly 280 through front display opening 132, and to improve overall perception of the workmanship and quality of gardening appliance 100.

According to exemplary embodiments of the present subject matter, position sensing assembly 330 generally includes a proximity sensor assembly 332 that is mounted onto or underneath sump 312 and a proximity indicator assembly 334 that is mounted onto or underneath turntable 304. In general, proximity sensor assembly 332 and proximity indicator assembly 334 may include any system of sensors, emitters, detectors, triggers, switches, actuators, or other detection assemblies that operate together to provide feedback regarding the angular orientation of turntable 304. According to the illustrated embodiment, proximity sensor assembly 332 is fixed underneath sump 312 while proximity indicator assembly 334 rotates along with turntable 304. However, it should be appreciated that according to alternative embodiments, these assemblies 332, 334 may be reversed while remaining within the scope of the present subject matter.

According to the illustrated embodiment, proximity sensor assembly 332 generally includes a first proximity sensor 340 that is mounted to sump 312 at a first radial position 342 and a second proximity sensor 344 that is mounted to sump 312 and a second radial position 346 different than the first radial position 342. As used herein, the "radial position" is intended to the radial location (e.g., as measured relative to the motor shaft 322 or central axis) on either sump 312 or turntable 304, depending on the context. According to an exemplary embodiment, each of first proximity sensor 340 and second proximity sensor 344 may be mounted to sump 312 along a hub alignment position 348 along the circumferential direction C. As shown, hub alignment position 348 is identified by a dotted line extending along the radial direction R at a fixed circumferential position on sump 312. In this manner, hub alignment position 348 may be used as a reference angle, e.g., to determine an angular orientation of turntable 304. Specifically, the angular orientation of turntable 304 angle may be measured along the circumferential direction C between hub alignment position 348 and a particular position (or positions) identified by proximity indicator assembly 334.

As shown, proximity indicator assembly 334 may include a plurality of proximity indicators (e.g., identified generally by reference numeral 350) that are positioned at desirable locations on turntable 304 and are detectable by proximity sensor assembly 332 (e.g., first proximity sensor 340 and second proximity sensor 344) when turntable 304 is rotated to align proximity indicators 350 with the hub alignment position 348 along the circumferential direction C. In this regard, when proximity indicators 350 are positioned over proximity sensors 340, 344 along the axial direction A or the vertical direction V, one or both of proximity sensors 340, 344 may be triggered depending on the radial position of proximity indicators 350. For example, if a proximity sensor 350 that is mounted to turntable 304 at the first radial position 342, that proximity sensor 350 will trigger first proximity sensor 340 (i.e., also positioned at the first radial position 342) one time for each revolution of turntable 304.

In other words, proximity indicators 350 may be positioned at various circumferential positions around turntable 304 and at different radiuses is to define a unique radial configuration at each circumferential position. When each respective circumferential position crosses hub alignment position 348, such that proximity sensors 350 positioned on that radial line or at that circumferential position pass over first proximity sensor 340 and second proximity sensor 344, a controller coupled to first proximity sensor 340 and second proximity sensor 344 (e.g., such as controller 174) may detect the unique radial configuration of proximity sensors 350 to determine the angular orientation of turntable 304 relative to sump 312. This process will be described in more detail below according to exemplary embodiments of the present subject matter.

Figure 15:
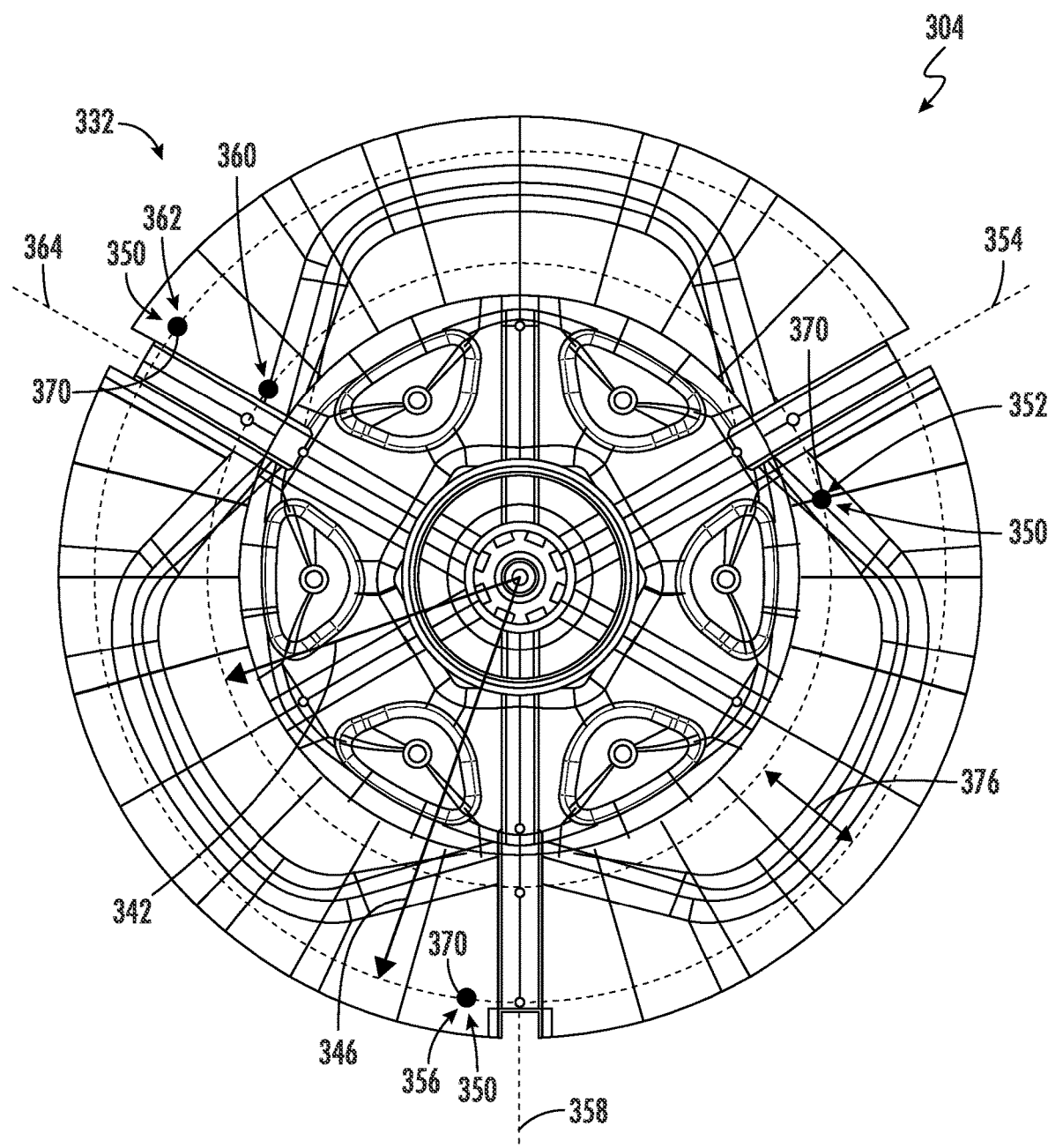
FIG. 15 provides a top view of the exemplary sump and turntable of FIG. 10 according to an exemplary embodiment of the present subject matter.
Figure 16:
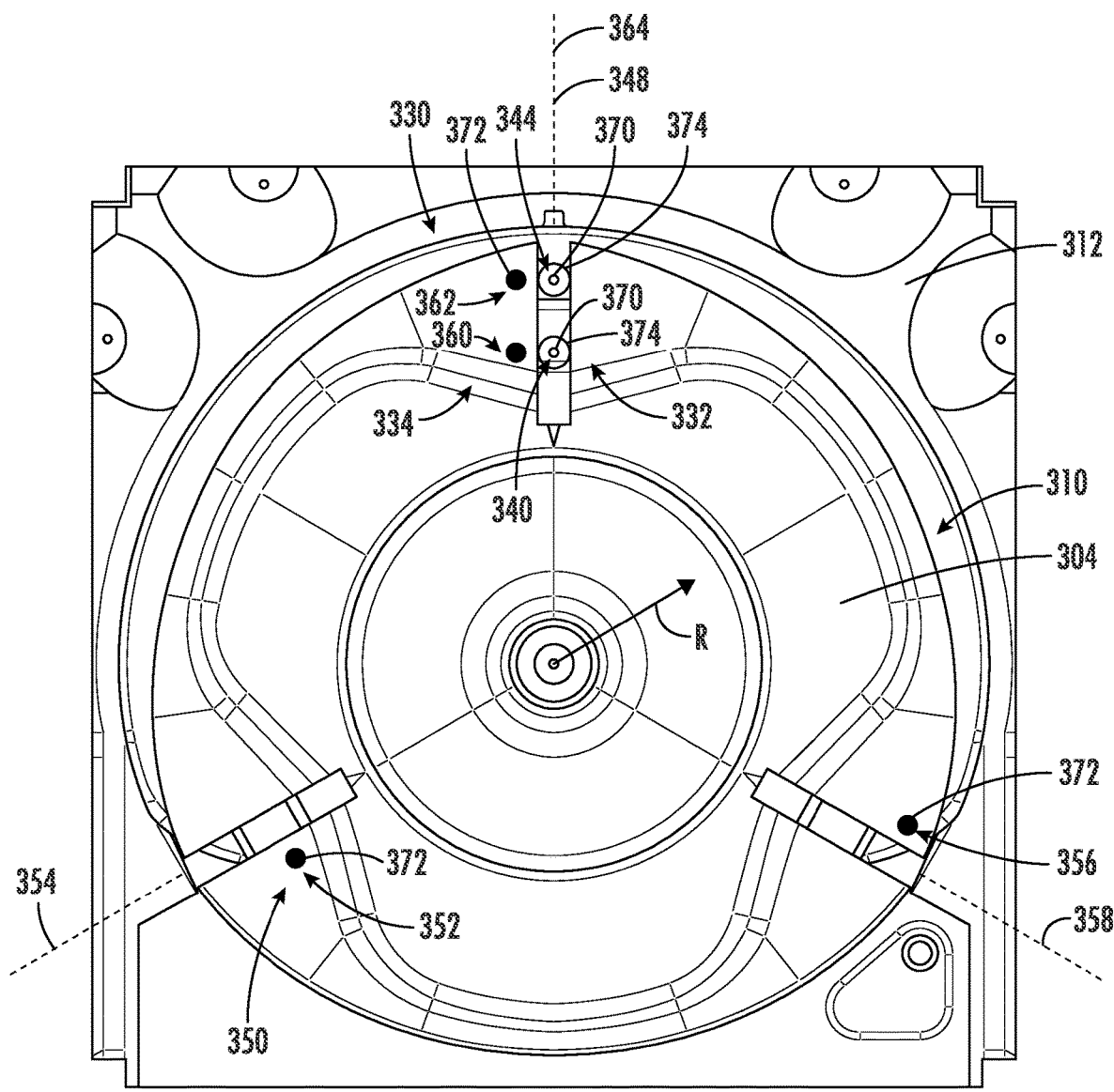
FIG. 16 provides a top view of the exemplary sump of FIG. 10 according to an exemplary embodiment of the present subject matter.

Referring now specifically to the illustrated embodiment, and as best shown schematically in FIGS. 15 and 16, the plurality of proximity indicators 350 may generally include a first proximity indicator 352 mounted to turntable 304 at the first radial position 342 and at a first circumferential position 354 on turntable 304. In this manner, first proximity indicator 352 passes over first proximity sensor 340 when turntable 304 rotates to a first angular orientation, e.g., defined as an angular orientation where first circumferential position 354 is aligned with hub alignment position 348.

In addition, the plurality of proximity indicators 350 may include a second proximity indicator 356 mounted to turntable 304 at the second radial position 346 and at a second circumferential position 358 on turntable 304. In this manner, second proximity indicator 356 passes over second proximity sensor 344 as turntable 304 rotates to a second angular orientation, e.g., defined as an angular orientation where second circumferential position 358 is aligned with hub alignment position 348.

In addition, the plurality of proximity indicators 350 may include a third proximity indicator 360 mounted to turntable 304 at the first radial position 342 and a fourth proximity indicator 362 mounted to turntable 304 at the second radial position 346. Notably, both third proximity indicator 360 and forth proximity indicator 362 are mounted to turntable 304 at a third circumferential position 364, which corresponds to a third angular orientation of turntable 304. As a result, when turntable 304 is rotated such that third circumferential position 364 is aligned with or passes over hub alignment position 348, third proximity indicator 360 may pass over and trigger first proximity sensor 340, while fourth proximity indicator 362 may pass over and trigger second proximity sensor 344. By monitoring when proximity sensors 340, 344 are triggered and which proximity sensors 340, 344 triggered, controller 174 may be programmed to determine the angular orientation of turntable 304 relative to sump 312.

Specifically, the radial configuration of proximity sensors 350 at each circumferential position 354, 358, 364 may define a unique two-digit binary code corresponding to the respective circumferential positions. In this regard, for example, the first digit of the two-digit binary code may be a 0 or a 1 depending on whether first proximity sensor 340 is triggered. By contrast, the second digit of the two-digit binary code may be a 0 or 1 depending on whether second proximity sensor 344 is triggered. Thus, using this identification protocol, when first circumferential position 354 of turntable 304 passes hub alignment position 348, only first proximity sensor 340 is triggered, so the two-digit binary code would be [10]. By contrast, when second circumferential position 358 of turntable 304 crosses hub alignment position 348, only second proximity sensor 344 is triggered, so the two-digit binary code would be [01]. If the third circumferential position 364 rotates past hub alignment position 348, both proximity sensors 340, 344 are triggered, so the two-digit binary code would be [11].

Notably, according to exemplary embodiments, turntable includes proximity sensors 350 at three circumferential positions. As such, according to exemplary embodiments, the first, second, and third circumferential positions 354, 358, 364 are spaced apart by 120° along the circumferential direction C. However, it should be appreciated that according to alternative embodiments, turntable 304 may have any other suitable number, type, and configuration of proximity sensors 350 positioned at any suitable number of circumferential positions in any suitable manner about the circumferential direction C. Moreover, although proximity sensor assembly 332 is described herein as having two proximity sensors 340, 344 for generating a two-digit binary code, it should be appreciated that according to exemplary embodiments, turntable 304 may have additional proximity sensors positioned at other radial locations to generate additional positional codes. Variations and modifications are possible and within the scope of the present subject matter.

Notably, controller 174 of gardening appliance 100 may be configured for regulating the rotation of grow module 200 based on feedback from positioning assembly 330. In this regard, for example, controller 174 may receive a command to rotate to a target angular orientation, e.g., such as the angular orientation where first chamber 212 is positioned toward front display opening 132. Upon determining the target angular orientation of grow module 200 and turntable 304, controller 174 may obtain a two-digit binary code associated with the target angular orientation (e.g., from a lookup table, database, etc.). Controller 174 may then operate drive assembly 300 to rotate turntable 304 until the target angular orientation is achieved. In other words, controller 174 may be configured for stopping rotation of turntable 304 when the two-digit binary code associated with the target angular orientation is generated by positioning assembly 330. It should be appreciated that this is an exemplary description of one potential operating method of controller 174 using positioning assembly 330. Variations and modifications to this control methodology are possible and within the scope of the present subject matter.

It should be appreciated that proximity sensor assembly 332 and proximity indicator assembly 334 may include any suitable sensors and compatible trigger mechanisms for interacting with each other to generate a signal representative of the position of turntable 304. For example, according to the illustrated embodiment, proximity sensor assembly 332 includes Hall-effect sensors 370, which are generally configured for detecting the proximity of a magnetic field. In addition, proximity indicators 350 may each be one or more magnets 372 that are positioned for interacting with Hall-effect sensors 370, e.g., as described herein. In other words, Hall-effect sensors 370 remain fixed to sump 312 along hub alignment position 348 at first radial position 342 and second radial position 346. By contrast, magnets 372 are positioned at the desired radial positions on turntable 304 (e.g., mounted below, onto, or within turntable 304) as described above. Hall-effect sensors 370 may provide feedback to the controller as magnets 370 rotate past Hall-effect sensors 370.

According to the illustrated embodiment of the present subject matter, Hall-effect sensors 370 may be mounted below sump 312, e.g., such that they are protected from water that is collected within collection reservoir 314. In addition, magnets 372 may be mounted on a bottom side of or integrated into turntable 304. In this manner, the magnetic field generated by each magnet 372 may be detected by the respective Hall-effect sensor 370. Moreover, Hall-effect sensors 370 may be omni-polar magnetic sensors, such that they may detect the magnetic fields of magnets 372 regardless of how magnets 372 are installed, e.g., whether the north/south poles of magnets 372 are oriented up or down. It should be appreciated that the position and means for attaching Hall-effect sensors 370 and magnets 372 may vary while remaining within scope the present subject matter.

Although the illustrated embodiment shows proximity sensor assembly 332 and proximity indicator assembly 334 as including Hall-effect sensors 370 and magnets 372, it should be appreciated that any other suitable sensors and trigger mechanisms or devices may be used according to alternative embodiments. For example, motion sensors, camera systems, optical sensors, acoustic sensors, or simple mechanical contact switches may be used according to alternative embodiments. In this regard, proximity sensor assembly 332 may include one or more optical sensors and proximity indicator assembly 334 may include one or more optical reflectors. According to alternative embodiments, proximity sensor assembly 332 may include one or more mechanical switches or contacts and proximity indicator assembly 334 may include one or more mechanical triggers, probes, or extension arms. Other suitable sensors and indicators may be used to facilitate operation of positioning assembly 330 while remaining within the scope of the present subject matter.

Notably, as best shown schematically in FIGS. 15 and 16, Hall-effect sensors 370 are not simple on/off switches, but instead have a substantially circular detection zone (e.g., identified generally by reference numeral 374). In general, this detection zone may have a nonzero diameter that may be predetermined, e.g., through sufficient lab testing. Notably, stopping turntable 304 at the first detection of a magnetic field may result in misalignment between proximity sensors 340, 344 and proximity indicators 352, 356, 360 (e.g., as magnets 372 are not positioned precisely over Hall-effect sensors 370). As a result, grow module 200 may not be perfectly aligned within cabinet 102. To rectify this issue, controller 174 may be programmed to rotate turntable 304 in a manner that compensates for this circular detection zone 374.

For example, controller 174 may be able to determine the time when Hall-effect sensor 370 detects the presence of a magnet 372. In other words, controller 174 may identify the point where magnetic field generated by magnet 372 enters the circular detection zone 374 Hall-effect sensor. However, controller 174 may operate drive assembly 300 to rotate turntable 304 through an additional incremental amount, e.g., to compensate for the diameter of circular detection zone 374 and ensure that the magnets 372 are centered within circular detection zone 374 before stopping rotation.

Notably, to prevent interaction between the first proximity sensor 340 and magnets 372 positioned at second radial position 346, and to prevent interaction between second proximity sensor 344 and magnets 372 positioned at first radial position 342, it may be desirable that the first radial position 342 and the second radial position 346 are spaced apart along the radial direction R by a radial distance 376 that is greater than circular detection zone 374. According still other embodiments, radial distance 376 may be greater than one circular detection zone 374, greater than two circular detection zones 374, or greater.

According to exemplary embodiments, controller 174 may be preprogrammed with knowledge regarding the circular detection zone 374 of Hall-effect sensors 370. By contrast, according to alternative embodiments, controller 174 may be programmed for periodically initiating a calibration procedure for ensuring that magnets 372 are centered within the circular detection zone 374 of Hall-effect sensors 370 before the rotation of turntable 304 stopped. For example, this calibration process may include rotating the turntable 304 in a first direction, e.g., the counterclockwise direction, and determining when the magnet 372 is first detected. The angular position where the magnet 372 is first detected may be recorded as a first angular position. Controller 174 may then continue rotation of turntable 304 in the same direction (e.g., counterclockwise) until the magnet 372 is no longer detected (e.g., magnet 372 has left the circular detection zone 374). The calibration process may then include rotating the turntable in a second direction, e.g., the clockwise direction, and determining when the magnet 372 is again first detected. The angular position of turntable 304 when the magnet 372 is first detected while moving clockwise may be the second angular position. The circular detection zone 374 may be determined based at least in part on the difference between the second angular position and the first angular position. Other calibration procedures are possible and within scope the present subject matter.

According to exemplary embodiments, it may be desirable to slow the speed of rotation of turntable 304 as the various circumferential positions are approaching the hub alignment position 348. Doing this may increase the accuracy of positioning of turntable 304, by permitting controller 176 to better regulate drive assembly 300 to stop turntable 304 at the desired angular orientation. Thus, when turntable 304 is being moved from the first angular position (e.g., corresponding to the first circumferential position 354 aligning with the hub alignment position 348) to a second angular position (e.g., corresponding to the second circumferential position 358 aligning with the hub alignment position 348), controller 174 may implement an acceleration profile that moves between these two angular positions at a suitable rate while preventing an overshoot of the second angular position. In this regard, for example, controller 174 may operate drive assembly 300 by starting at the first angular position, increasing the rotational speed of turntable 304 to a cruise speed, and then decreasing the rotational speed of turntable 304 to a detection speed prior to reaching the second angular position. This detection speed may be maintained until the positioning assembly 330 detects that the second angular position has been reached.

Aspects of the present subject matter provide a gardening appliance 100 having a grow module 200 with Hall-effect sensing and zone identification features. In specific, three sets of magnets 372 may be permanently affixed to the underside of turntable 304 which serves as the base of the rotating grow module 200. Each set consists of either one or two magnets 372 which are located along radial lines at one or both of two radial distances from the center of rotation. The magnets 372 of each set are separated by enough distance that their respective magnetic fields have negligible effect on the others. Each set is evenly and angularly separated around the turntable 304 for example, by 120 degrees for three growing zones. This combination uniquely assigns a two-digit binary representation for each 120 degree grow zone. One set may contain magnets at both radiuses [11], one at just the small radius [10], and one at just the larger radius [01]. Two Hall-effect sensors 370 are discretely mounted beneath the non-rotating sump 312 at the same two radiuses of the magnet positions along the radial line of the back-most set of magnets when the turntable 304 is properly positioned. These sensors 370 can be of the omni-polar type so that the polarity of the detected magnets 372 does not matter. The Hall-effect 370 sensors will detect the set of magnets 372 in the turntable 304 once the correct position is reached and accordingly a signal is sent to the appliance controls to stop grow module 200 rotation. This allows for accurate position and identification of each side of the grow module 200. This means that the grow module 200 will be able to successfully position itself and properly contact the environmental seals at the end of each indexing rotation regardless of any clutch slippage. Further, the user will always know the position of each side of the grow module 200 due to the unique magnet identification.

The subject matter contemplates accurate positioning of turntable 304 based on feedback from Hall-effect sensors 370. As a result, accurate calibration of these sensors may be desirable to accurately position turntable 304 and grow module 200 in the desired zones. This calibration procedure may include the following: Step 1: Rotate the turntable 304 until a magnet 372 is detected. At this point, the motor feedback starts counting from zero. Step 2: Rotation continues in the same direction so that the sensor 372 passes through the entire circular detection zone 374 and reaches an opposite side, at which point the rotation stops. Step 3: Rotation begins again in the opposite direction until the magnets 372 are detected again. Step 4: The diameter of the circular detection zone 374 is calculated from the displacement of the motor between the detections in steps 1 and 3. Step 5: Steps 1-4 are repeated for the remaining magnets sets. The calibration technique can be executed before start of the grow cycle or during a pause phase of gardening appliance 100 and can be repeated automatically, or via a manual request by the user. The detection diameter as measured in step 4 may underestimate the true detection diameter by a term equal to the backlash of the transmission between the motor shaft and the turntable, which can be approximated by lab testing.

Aspects of the present subject matter are further directed to methods for precise location adjustment of the turntable. In this regard, during rotate of turntable 304 and grow module 200, the Hall-effect sensor 370 detects the magnet 372 when the magnetic field is within the detection zone of the Hall-effect sensor (e.g., a substantially circular detection zone having a non-zero diameter). Accordingly, the turntable must rotate an additional corrective amount equivalent to the radius of the circular detection zone 374 at the radius of the magnet 372 location (e.g., first radial position 342 or second radial position 346). After such a correction, the drive assembly 300 will stop rotation of turntable 304 where magnet 372 will stop at the center of the circular detection zone 374, and the turntable 304 and grow module will thus be in the correct position. The control of this corrective angular adjustment can be achieved by determining the angular displacement of the magnets within the Hall-effect sensor's circular detection zone 374. While motor feedback may not account for clutch slippage, it is unlikely that slippage will be able to occur within the period from magnet detection to the end of rotation.

According to exemplary embodiments, the proposed rotation cycle to index the turntable 304 from one grow zone to the next is as follows. During phase 1, drive assembly 300 accelerates turntable 304 to a cruising speed and then decelerates to a detection speed. There might be no closed loop feedback during this phase. If no slippage occurs, the turntable 304 will rotate through some set angle, e.g., 115 of the total 120 degrees. According to alternative embodiments, the detection speed may be substantially equal to the cruising speed, thus eliminating any pre-detection deceleration. Phase 2 includes operating drive assembly 300 at a relatively low detection speed until either the phase times out (which means that something may be preventing the turntable 304 from rotating and thus slippage is occurring) or until the magnets 372 are sensed by Hall-effect sensors 370. Assuming magnets 372 are sensed in phase 2, phase 3 includes applying the corrective positioning angular adjustment in order to precisely stop the turntable 204 and grow module 200 at the optimal or desired location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance defining a vertical direction, the gardening appliance, comprising:
   a liner positioned within a cabinet and defining a grow chamber;
   a grow module mounted within the liner and defining a plurality of apertures for receiving one or more plant pods;
   a sump positioned proximate a bottom of the cabinet and defining a collection reservoir;
   a turntable rotatably mounted to the sump and being configured for supporting the grow module;
   a position sensing assembly operably coupled to the sump and the turntable for monitoring an angular position of the turntable relative to the sump, the position sensing assembly comprising:
      a proximity sensor assembly mounted to the sump and comprising a first proximity sensor mounted to the sump at a first radial position and a second proximity sensor mounted to the sump at a second radial position; and
      a proximity indicator assembly mounted to the turntable and comprising a plurality of proximity indicators positioned at two or more circumferential positions and at different radiuses to define a unique radial configuration at each of the two or more circumferential positions, the unique radial configuration of the plurality of proximity sensors at each of the two or more circumferential positions being detectable by the first proximity sensor and the second proximity sensor; and
   a drive assembly for selectively rotating the turntable within the grow chamber based at least in part on the angular position of the turntable.

2. The gardening appliance of claim 1, wherein the first proximity sensor and the second proximity sensor are mounted on the sump at a hub alignment position along a circumferential direction and wherein the proximity indicator assembly is mounted to the turntable such that the proximity indicator assembly is detectable by the proximity sensor assembly when the turntable is rotated to align the proximity indicator assembly with the hub alignment position along the circumferential direction.

3. The gardening appliance of claim 1, wherein the unique radial configuration comprises one or more of the plurality of proximity indicators being position at the first radial position, the second radial position, or both the first radial position and the second radial position to define a two-digit binary code corresponding to each of the two or more circumferential positions.

4. The gardening appliance of claim 1, further comprising a controller configured to:
   determine a target angular orientation of the turntable;
   obtain a two-digit binary code associated with the target angular orientation;
   operate a drive assembly to rotate the turntable; and
   stop the rotation of the turntable when the two-digit binary code is generated by the position sensing assembly.

5. The gardening appliance of claim 1, wherein the two or more circumferential positions comprises three circumferential positions that are spaced apart by 120 degrees along the circumferential direction.

6. The gardening appliance of claim 1, wherein the plurality of proximity indicators comprises:
   a first proximity indicator mounted to the turntable at the first radial position and at a first circumferential position on the turntable, such that the first proximity indicator passes over the first proximity sensor as the turntable rotates to a first angular orientation;
   a second proximity indicator mounted to the turntable at the second radial position and at a second circumferential position on the turntable, such that the second proximity indicator passes over the second proximity sensor as the turntable rotates to a second angular orientation;
   a third proximity indicator mounted to the turntable at the first radial position and at a third circumferential position on the turntable, such that the third proximity indicator passes over the first proximity sensor as the turntable rotates to a third angular orientation; and
   a fourth proximity indicator mounted to the turntable at the second radial position and at the third circumferential position on the turntable, such that the fourth proximity indicator passes over the second proximity sensor as the turntable rotates to the third angular orientation.

7. The gardening appliance of claim 1, wherein the first radial position and the second radial position are spaced apart along the radial direction by a radial distance that is greater than a circular detection zone of the first proximity sensor and the second proximity sensor.

8. The gardening appliance of claim 1, wherein the proximity sensor assembly comprises one or more Hall-effect sensors and the proximity indicator assembly comprises one or more magnets.

9. The gardening appliance of claim 8, wherein the one or more Hall-effect sensors are mounted below the sump and the one or more magnets are mounted below, onto, or within the turntable.

10. The gardening appliance of claim 8, wherein the one or more Hall-effect sensors are omni-polar magnetic sensors.

11. The gardening appliance of claim 8, wherein a hall-effect sensor of the one or more Hall-effect sensors defines a circular detection zone, and wherein the drive assembly rotates the turntable to ensure a magnet of the one or more magnets is centered within the circular detection zone before stopping rotation.

12. The gardening appliance of claim 11, wherein ensuring the magnet is centered within the circular detection zone comprises:
   rotating the turntable using the drive assembly;
   identifying when the Hall-effect sensor first detects the magnet; and
   rotating the turntable through an angular displacement after the Hall-effect sensor first detects the magnet, the angular displacement covering half of the circular detection zone.

13. The gardening appliance of claim 11, wherein the circular detection zone for the Hall-effect sensor is calibrated by:
   rotating the turntable in a first direction
   determining when the magnet is first detected and recording a first angular position;
   continuing rotation in the first direction until the magnet is not detected;
   rotating the turntable in a second direction;
   determining when the magnet is first detected and recording as a second angular position; and determining the circular detection zone based at least in part on the difference between the second angular position and the first angular position.

14. The gardening appliance of claim 2, wherein the proximity sensor assembly comprises one or more optical sensors and the proximity indicator assembly comprises one or more optical reflectors.

15. The gardening appliance of claim 2, wherein the proximity sensor assembly comprises one or more mechanical switches and the proximity indicator assembly comprises one or more mechanical triggers.

16. The gardening appliance of claim 1, wherein the drive assembly comprises:
   a motor assembly comprising a drive shaft; and
   a clutch assembly mechanically coupling the drive shaft of the motor assembly and the turntable.

17. A method of operating the gardening appliance of claim 1, wherein the drive assembly is configured to rotate the turntable between a first angular position and a second angular position, the method comprising:
   starting at the first angular position, operating the drive assembly to increase a rotational speed of the turntable to a cruise speed as the turntable rotates away from the first angular position;
   decreasing the rotational speed of the turntable to a detection speed prior to reaching the second angular position; and
   maintaining the rotational speed of the turntable at the detection speed until the positioning assembly detects that the second angular position has been reached.

18. A position sensing assembly for monitoring an angular position of a turntable within a sump of an indoor gardening appliance to provide feedback to a drive assembly for selectively rotating the turntable, the position sensing assembly comprising:
   a first proximity sensor and a second proximity sensor mounted to the sump at hub alignment position along a circumferential direction, the first proximity sensor being positioned at a first radial position and the second proximity sensor being positioned at a second radial position, wherein the first proximity sensor and the second proximity sensor are Hall-effect sensors; and
   a plurality of proximity indicators positioned at three circumferential positions on the turntable, the plurality of proximity indicators being positioned at different radiuses at each of the three circumferential positions to define a two-digit binary code corresponding to each of the three circumferential positions that is detectable by the first proximity sensor and the second proximity sensor, wherein the proximity indicator assembly comprises one or more magnets, and wherein a Hall-effect sensor of the one or more Hall-effect sensors defines a circular detection zone, and wherein the drive assembly rotates the turntable to ensure a magnet of the one or more magnets is centered within the circular detection zone before stopping rotation.

19. The position sensing assembly of claim 18, wherein the plurality of proximity indicators comprises:
   a first proximity indicator mounted to the turntable at the first radial position and at a first circumferential position on the turntable, such that the first proximity indicator passes over the first proximity sensor as the turntable rotates to a first angular orientation;
   a second proximity indicator mounted to the turntable at the second radial position and at a second circumferential position on the turntable, such that the second proximity indicator passes over the second proximity sensor as the turntable rotates to a second angular orientation;
   a third proximity indicator mounted to the turntable at the first radial position and at a third circumferential position on the turntable, such that the third proximity indicator passes over the first proximity sensor as the turntable rotates to a third angular orientation; and
   a fourth proximity indicator mounted to the turntable at the second radial position and at the third circumferential position on the turntable, such that the fourth proximity indicator passes over the second proximity sensor as the turntable rotates to the third angular orientation.

* * * * *